March 10, 1925. 1,529,362
L. KLUMP ET AL
COMBINATION TAIL LIGHT AND LICENSE CARRIER
Filed April 18, 1921 2 Sheets-Sheet 1
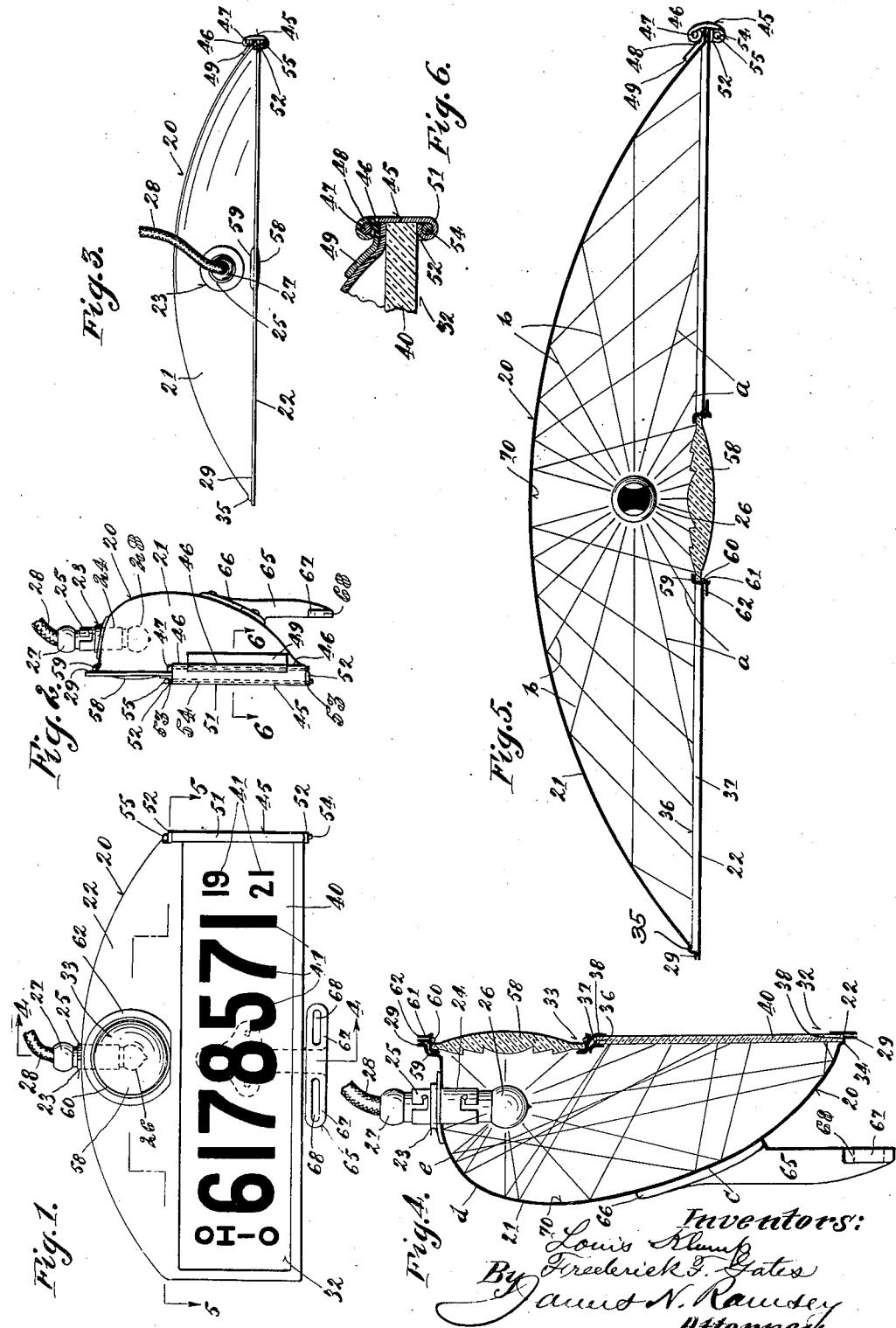

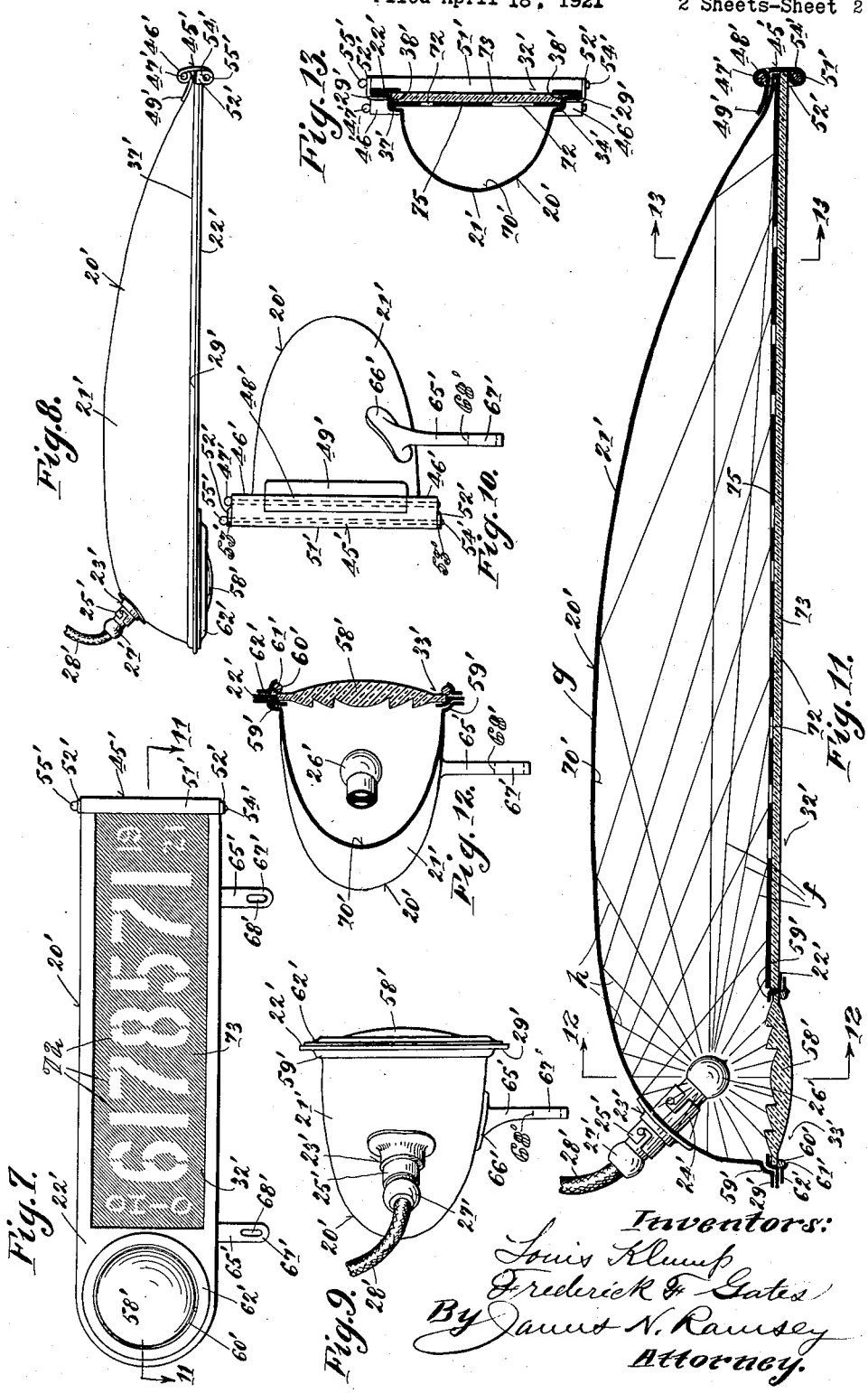
March 10, 1925. L. KLUMP ET AL 1,529,362
COMBINATION TAIL LIGHT AND LICENSE CARRIER
Filed April 18, 1921  2 Sheets-Sheet 2
Inventors:
Louis Klump
Frederick F. Gates
By James N. Ramsey
Attorney.

Patented Mar. 10, 1925.

1,529,362

UNITED STATES PATENT OFFICE.

LOUIS KLUMP, OF NEWPORT, KENTUCKY, AND FREDERICK F. GATES, OF CINCINNATI, OHIO.

COMBINATION TAIL-LIGHT AND LICENSE CARRIER.

Application filed April 18, 1921. Serial No. 462,170.

*To all whom it may concern:*

Be it known that we, LOUIS KLUMP and FREDERICK F. GATES, citizens of the United States, residing in the city of Newport, in the county of Campbell and State of Kentucky, and in the city of Cincinnati, in the county of Hamilton and State of Ohio, respectively, have invented certain new and useful Improvements in Combination Tail-Light and License Carriers, of which the following is a specification.

Our invention relates to combination tail light and license carriers for motor vehicles and the like, whereby a danger signal is illuminated by the same light source that serves to illuminate the license number. Heretofore, illuminated license carriers have been used, but the license tag has been fully exposed to the weather and rapidly becomes covered which foreign matter thrown up by the wheels of the vehicle. Also the illumination of the license tag itself has not been satisfactory in that the light intensity has not been evenly distributed over its surface.

It is the object of our invention, to provide a carrier for the license number, and also combine therewith a danger signal transparency illuminated by a common light source; further to make the numerical designation comprising the license number readily visible both day and night; further to distribute illumination with a uniform intensity over the entire surface of the license plate; further to more clearly make visible the characters comprising the license number even though foreign matter accumulates thereon; and further to provide for the ready cleaning of the license number and the ready removal thereof.

Our invention consists of a light source mounted within a specially formed casing, having a danger signal transparency and license number transparency therein and also having reflecting surfaces, arranged in such a manner as to evenly distribute the intensity of illumination radiated from said light source over the surface of the license number; further in the means by which the characters comprising the license number are made more readily visible, either in daylight or darkness, even though an accumulation of foreign matter is had thereon; further in the means by which the license number transparency is secured and readily removed.

Our invention further consists in the parts and combination and arrangement thereof as herein described and claimed.

In the drawings:

Fig. 1 is a front elevation of our improved device.

Fig. 2 is an end elevation of the same.

Fig. 3 is a plan view of the same.

Fig. 4 is a vertical cross section taken on the line 4—4 of Fig. 1.

Fig. 5 is a horizontal longitudinal section taken on the line 5—5 of Fig. 1.

Fig. 6 is a cross section and detail view of the tag retaining latch taken on the line 6—6 of Fig. 2.

Fig. 7 is a front elevation of a modification of our improved device having a light source mounted at one side of the license number transparency.

Fig. 8 is a plan view of the same.

Fig. 9 is an elevation of one end of the same.

Fig. 10 is an elevation of the other end, showing the means by which the license transparency is secured.

Fig. 11 is a horizontal section taken on the line 11—11 of Fig. 7.

Fig. 12 is a vertical cross section taken on the line 12—12 of Fig. 11.

Fig. 13 is a similar view taken on the line 13—13 of Fig. 11.

In the embodiment of our invention as illustrated and showing a preferred form, a casing 20 comprises a rounded body portion 21 and flat front side 22. A socket member 23 is secured in the body portion and has a socket 24 projecting into the interior thereof and also a socket 25 on the outside thereof. An electric light bulb 26 is received in the socket 24 within the casing, in the usual manner, and a plug 27 to which an electrical conductor 28 is secured is received in the usual manner in the socket 25 on the outside of the casing.

The front side 22 is secured to a flange 29 formed on the periphery of the body portion as by electric spot welding. The front side has a rectangular opening 32 and a circular opening 33 therein. The circular opening is located centrally above the rectangular opening and directly opposite the light bulb. The lower edge of the body portion has a rabbet 34 formed therein, and one of the side edges thereof has a rabbet 35 formed therein. A strip 36 having a rabbet 37 formed therein is secured to the inner surface of the front side adjacent the upper edge of the rectangular opening. A groove 38 is thus formed adjacent the upper, lower and one of the side edges of the rectangular opening.

A plate of transparent material 40, such as glass, preferably frosted on the surface facing the interior of the reflector is received in the groove 38 and has thereon opaque character designations 41 which form the license number. The character designations are preferably of material such as black enamel, and fired into the glass. The license number is thus made clearly visible either during the day when the light is turned off or at night when the light is turned on.

To hold the transparent plate in place, a latch 45 is pivoted by a curl 46 about a pin 47, held in a curl 48 of a stationary member 49, secured to the body portion as by spot welding. The latch is held in closed position as by having a curl 51 received between a pair of lugs 52 secured to the casing as by spot welding. The lugs 52 have holes 53 therein. A removable pin 54 having a head 55 thereon passes through the holes 53 and the curl 51 thereby securely holding the latch in closed position.

A red "Fresnal" type signal lens 58 is held in a circular rabbet 59 formed in the front side 22 about the circular opening 33 as by a spring locking ring 60 received in a groove 61 formed by a circular flange 62, spot welded to the front side of the casing. The lens 58 is so placed as to be in central axial alignment with the light bulb.

For supporting our improved device and securing the same to the vehicle a bracket 65, has a flange 66 secured to the casing as by spot welding or brazing. The bracket further has lugs 67 formed thereon which have slots 68 therein through which suitable bolts may pass to secure the same to the vehicle.

It is well known that rays of light from a stationary source, radiate equally in all directions. Therefore, the farther that the surface on which the light rays fall is away from the source, the less the intensity of illumination. We will first consider the distribution of illumination in a horizontal plane. The direct rays indicated at $a$ (see Fig. 5) fall on the glass plate, with a diminishing intensity as they approach the extreme left and right ends. If the light was solely distributed in this manner, the license number would appear extremely bright in the center and practically no illumination would be noticeable adjacent its ends. I have therefore provided the body portion of the casing with an internal polished reflecting surface 70, and curve the same in such a manner as to receive the indirect rays indicated at $b$ and reflect them toward the transparent plate with a gradually increasing intensity toward the ends. In this manner, the diminishing intensity of the direct illumination toward the ends is compensated for by the increasing intensity toward the ends of the reflected illumination.

We will now consider the distribution of light intensity in a vertical plane, (see Fig. 4). The reflecting surface 70 is curved vertically as well as horizontally in such a manner as to gather in all the radiated light and distribute it in an even manner over the rear surface of the glass. Thus the reflecting surface is formed cross-sectionally of a plurality of merging curves comprising a curvature $c$, a second curvature $d$, and a third curvature $e$. All the light rays striking the curvature $c$ will be reflected to and distributed over the inner surface of the transparent plate with a uniform intensity. The light rays striking the curvature $d$ will be reflected in such a manner as to be distributed with uniform intensity over the upper half of the transparent plate. The light rays striking the curvature $e$ are reflected to the curvature $c$, which in turn reflects them to the transparent plate where they are distributed with uniform intensity over the lower half thereof. It will be noted that very little of the light radiation is lost and the greater part is utilized to evenly illuminate the license number.

In Figs. 7 to 13 inclusive we have shown a modification of our improved device, wherein the light source is placed to one end of the license number having the character designations formed by perforations 72 in an opaque plate 75 inserted behind a transparent plate 73. The other parts are therein referred to by similar but primed reference numerals. Referring now to Fig. 11, the direct rays $f$ strike the perforated plate 75 with an intensity gradually diminshing toward the end away from the light source. To compensate for this diminishing intensity of illumination, the reflecting surface 70' is curved as shown at $g$, which reflects the indirect rays $h$ toward the license number with gradually increasing intensity toward the end away from the light source. In this manner, the diminishing intensity of the direct rays is compensated for by the increasing intensity of the indirect rays. Thus every part of the license number is evenly illuminated.

Our improved device is readily adapted to be cleaned as foreign matter is easily removed from the glass surface. Also the license number is clearly visible at all times as a result of the uniform distribution of illumination.

Having thus described our invention, what we claim as new and desire to secure by Letters Patent, is:

In a device of the character described, a casing having an opening therein, a light source therein, a rabbet bounding in said opening, and adapted to permit the rays of light to shine through the entire said opening from said light source, a signal transparency received in said rabbet, a circular groove adjacent said rabbet on the outside of said flat side, a releasable split ring received in said groove whereby said signal transparency is held in said rabbet, said flat side having a second opening therein, a groove bounding part of said opening, a light transmitting plate received in said groove and so located as to have all of its surfaces at other than a right angle to a line passing through said light source, opaque character designations on said light transmitting plate and a curved reflector for reflecting the light from said source to all parts of said light transmitting plate with a uniform intensity.

LOUIS KLUMP.
FREDERICK F. GATES.